United Stat

Nassenstein et al.

[11] 3,776,727
[45] Dec. 4, 1973

[54] TRANSMISSION HOLOGRAMS

[75] Inventors: Heinrich Nassenstein, Leverkusen; Joachim Eggers, Cologne, Stammheim, both of Germany

[73] Assignee: Agfa-Gevaert Aktiengesellschaft, Leverkusen, Germany

[22] Filed: June 16, 1969

[21] Appl. No.: 833,603

[30] Foreign Application Priority Data
June 29, 1968 Germany.................. P 17 72 756.9

[52] U.S. Cl.................................. 96/27 H, 350/3.5
[51] Int. Cl.......................... G02b 27/10, G03c 5/04
[58] Field of Search...................... 96/27 H; 350/3.5

[56] References Cited
UNITED STATES PATENTS

| 3,515,452 | 6/1970 | Pole | 350/167 |
|---|---|---|---|
| 3,107,170 | 10/1963 | Netke | 96/27 H |
| 3,519,423 | 7/1970 | Sharp | 96/76 |
| 3,532,406 | 10/1970 | Hartman | 350/3.5 |

OTHER PUBLICATIONS
The Bell System Technical Journal, April 1966, pp. 659–660, Vol. 65.

Color Holograms For White Light Reconstruction, "Applied Physics Letters," June 1, 1966, Volume 8, No. 11, pp. 286–287.

Mason, Photographic Processing Chemistry, p. 237 (1966).

*Primary Examiner*—Norman G. Torchin
*Assistant Examiner*—Alfonso T. Suro Pico
*Attorney*—Connolly and Hutz

[57] ABSTRACT

A transmission hologram which is reconstructable by white light is produced by the color processing in which the hologram itself is colored so as to obtain a high diffraction efficiency in the wave length region of maximum absorption and dispersion of the dye stuff which is used for coloring the holograms. Outside of this region of maximum absorption and dispersion the diffraction efficiency is low. Thus the transmission hologram is so colored that when illuminated with white light the hologram selects a narrow wave length region.

1 Claim, 3 Drawing Figures

TRANSMISSION HOLOGRAMS

The invention relates to methods for the production of transmission holograms with wavelength-selective reconstructability, and methods for the reconstruction of the holograms.

With a hologram, the radiation field is recorded by an interferometric process, recording its amplitude and its phase. The recording must be effected in such a way that, in the subsequent reconstruction process, a corresponding modulation of the radiation used for the reconstruction can occur. Corresponding to the two possibilities of an amplitude modulation and a phase modulation, both absorption and phase holograms are known.

Absorption holograms are also simply called density holograms. They have the advantage that they can be produced relatively easily, since they can be obtained by exposure of a silver halide emulsion layer and subsequent photographic processing. The information-carrying structure consists in this case of metallic silver. The disadvantage of absorption holograms lies in the extraordinarily low diffraction efficiency for the light during the reconstruction. The diffraction efficiency of absorption holograms is theoretically only a few percent under ideal conditions.

The second type of holograms, namely, the phase holograms referred to above, are indeed substantially superior to the absorption holograms as regards the diffraction efficiency of the light during the reconstruction. However, it is only with difficulty that they can be produced with the necessary quality. Phase holograms are obtained, for example, by bleaching photographic absorption holograms. The information-carrying structure then consists, for example of a different layer thickness of the photographic layer. The phase hologram produced in this way is not visible without particular means.

With a phase hologram, the phase of the reconstructing radiation is modulated by altering the optical path length $\int n \, ds$, wherein $n$ represents the refractive index and $ds$ the path length in the layer. A phase modulation is thus possible by two different methods; 1) by altering the path length, 2) by altering the refractive index.

Another subdivision of the holograms is based on whether, during production, the object and reference wave are incident from the same side or opposite sides on the photographic layer.

In the former case, transmission holograms are referred to. These can be reconstructed with arbitrary wavelengths within certain limits established by the grating equation. Consequently, a clear image is only obtained in the reconstruction if the light used for the reconstruction contains only wavelength of a sufficiently narrow spectral region. In order also to be able to carry out a reconstruction with white light, it is necessary to change over to the second type of hologram which has been mentioned, the so-called Bragg holograms (reflection holograms), in the exposure of which object wave and reference wave are incident from opposite sides on the photographic plate and produce a three-dimensional interference structure in the photographic layer. The reconstructed image of Bragg holograms is monochromic, although white light has been used, since it is known Bragg equation which is decisive in the reconstruction, the colour of the reconstructed image being dependent on the incidence angle. However, such Bragg holograms require photographic materials with very high resolution and correspondingly low sensitivity and the quality thereof is still not satisfactory at the present time.

The invention has for its object methods for the production of transmission holograms which can be wavelength-selectively reconstructed.

Transmission holograms have been found which can be wavelength-selectively reconstructed and of which the data-carrying structure consists of a dyestuff. It is advantageous to use photographic layer, which contain silver halides as light-sensitive substance, the exposed layers then being processed by conventional colour photographic development procedures.

A very high diffraction efficiency is obtained, if the refractive index difference in the maxima and minima of the dispersion curve with suitable dyestuffs is very high. Both molecularly dispersed and finely divided pigment dyestuffs are to be considered as dyestuffs. They are so selected that the refractive index in the maxima or minima of the dispersion curve differs as far as possible from the refractive index of the layer material, e.g., of gelatine. However, it is also possible for the refractive index of the layer material to be changed to a suitable value by inert additives. It is also possible to introduce dyestuffs having a dispersion curve that, for example, only the maximum or the minimum of the refractive index in the visible region is utilised.

Despite the advantageous properties of the transmission holograms, produced by the method described, these holograms have certain disadvantages, since a certainly small but still finite diffraction efficiency occurs in the absorption range on account of the simultaneously present amplitude modulation by the absorption of the dyestuff. The amplitude modulation just referred to is disadvantageous in those cases where it is important in certain wavelength ranges to minimize the diffraction efficiency.

As a result of further work in connection with the invention, a transmission phase hologram has now been found which can be selectively reconstructed according to wavelength and the data-carrying structure of which consists of a dyestuff. The layer portions between the structure of the coloured hologram are faintly dyed by a dyestuff which is such that it shows an absorption behaviour which is as far as possible similar to that of the image dyestuff.

For dyeing the layer portions between the hologram structures, i.e., the image background, it is advantageous to use the same dyestuff as that also employed for producing the hologram. A uniform coloured background can be obtained by the reference wave having a greater intensity than the object wave during the exposure of the hologram.

The dyestuff density necessary for reducing the diffraction efficiency to a lowest possible value is not restricted to a critical value. It will depend on the requirements set for the quality of the hologram in question. In general, densities between 0.3 and 0.5 have proved to be sufficient and advantageous.

Figure 3:
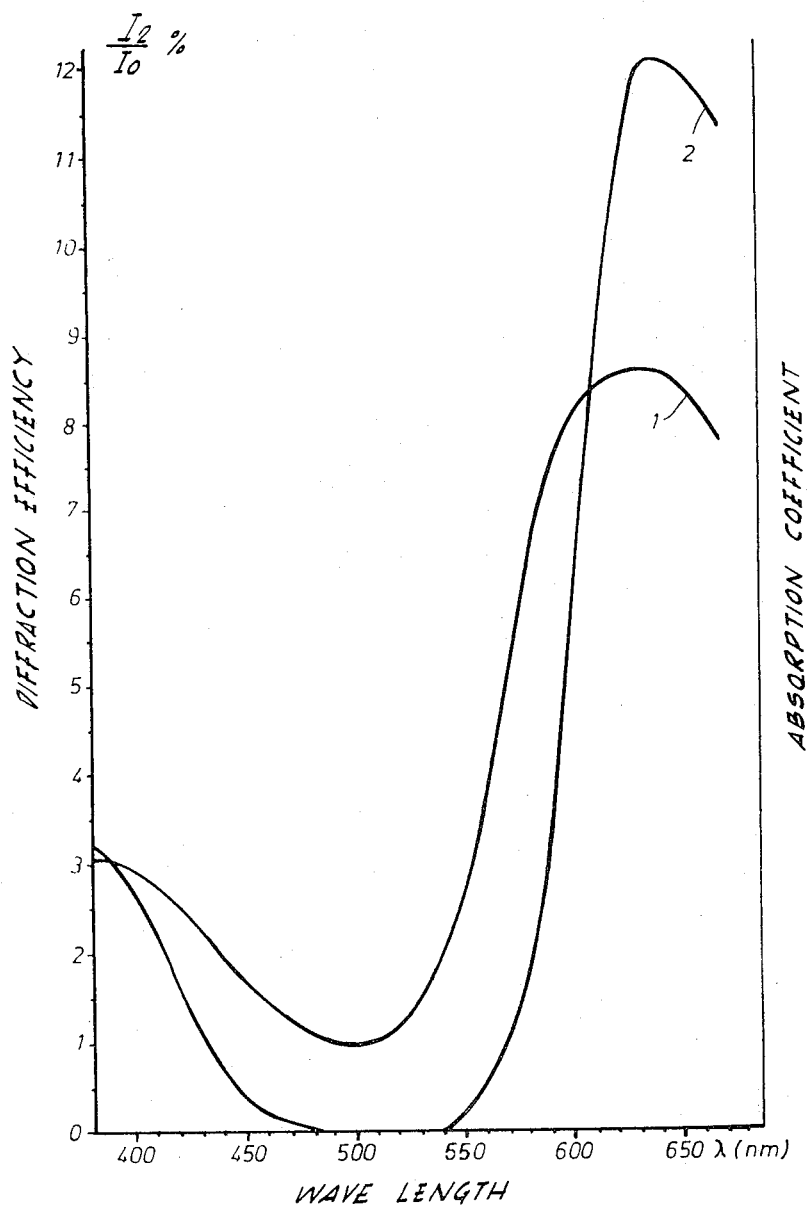
FIG. 3 shows diffraction efficiency and absorption plotted against wavelength of light.

The effectiveness of the uniform dyeing in accordance with the invention of the layer containing the hologram structure will be seen from FIG. 3. In the diagram, the diffraction efficiency I/Io is plotted as a percentage on the ordinate. The wavelength is given as $\mu$m on the abscissa.

The curves 1 and 2 represent the diffraction efficiency of two coloured transmission holograms as a function of the wavelength. Curve 1 is taken from a hologram of which the image density is relatively low, no coloured image background being provided. The selective reconstruction according to wavelength by the phase modulation of the dyestuff is clearly apparent, but it is also to be seen that there is a certain diffraction efficiency of about 1 percent in the absorption range of the dyestuff, which lies between approximately 400 and 540 $\mu$m, because of the amplitude modulation. Curve 2 represents the behaviour of a coloured hologram with greater image density an a uniform dyeing of the image-carrying layer. There is recognised the higher diffraction efficiency in the red region due to the higher phase modulation. In the absorption range of the dyestuff in the region of about 500 $\mu$m, the diffraction efficiency, on the contrary, returns to immeasurably small values.

An important controlling factor in the production of holograms is the resolving power of the information carrying photographic plates. Consequently, for the production of such coloured holograms it is preferable to use those photographic processes or materials which have a high resolving power, a finest possible granulation of the silver halide grains and a steep gradation.

It was another object of this invention to find new photographic processes or to modify known processes that coloured holograms with high resolution can be produced.

As a result of further work on this subject there has now been found a colour photographic process for the production of coloured transmission holograms with high resolving power. This is achieved by image-exposure of a light-sensitive silver halide emulsion layer with coherent radiation reflected from the object to be photographed and simultaneous uniform exposure to light with the coherent radiation, followed by photographic processing, in which the exposed layer is first of all subjected to a black-and-white development, whereafter the undeveloped silver halide is fixed, the silver image is bleached in the presence of an anion forming a silver salt, uniformly exposed colour developed and finally bleached and fixed.

Because of the production of the silver image in the first processing step, the process according to the invention does in fact take longer than conventional colour photographic processes, but by using such a process, a coloured hologram is obtained in the second processing step which has a substantially improved fine granular structure and resolution. Furthermore, the gradation of the final coloured image is generally steeper than with conventional processes. This effect is desired in respect of holograms.

It is obvious that reversal holograms can also be produced by the process according to the invention. The process is then so carried out that, instead of the black-and-white negative development, a black-and-white reversal development is carried out, and after a black-and-white first development, the negative silver image is removed by a halide-free bleaching bath and subsequent clarifying bath and after a uniform second exposure, the residual silver halide which is left is transformed in a second black-and-white developer into a positive silver image. Any undeveloped silver halide which still remains is thereafter fixed.

The positive silver image is then transformed by a halidecontaining bleaching bath into a positive silver halide image, which is colour-developed after repeated uniform exposure. Finally, the silver image formed during the colour development is bleached and fixed.

Holograms of the type according to the invention can, for example, be produced by simultaneous exposure of a light-sensitive photographic layer with the coherent radiation reflected by the subject to be recorded and simultaneous uniform exposure to light with the coherent radiation and subsequent photographic processing of the exposed photographic layer, the photographic processing being so conducted that a coloured hologram is formed. For this purpose, all colour photographic processes can in principle be used.

It is advantageous to use those photographic layers which contain silver halides as light-sensitive substance, the exposed layers then being processed in accordance with conventional colour photographic development procedures. The necessary colour couplers can either be present in the layer, or, using the known single developer process, in the colour yielding developer.

Since it is immaterial with holographic processes whether the information-carrying structure is positive or negative it is possible for the preparation to use both negative/positive processes or reversal processes or positive/positive processes, such as the known silver dye bleaching process.

For the preparation of coloured holograms, it is obviously possible also to use those processes for which no silver halides are necessary as light-sensitive substance, e.g., electrophotographic processes, processes in which dyestuffs present in the layer are bleached to form an image, or others. In principle, any process which leads to coloured images can be used.

The coloured holograms can also obviously consist of a mixture of different dyestuffs.

When using conventional photographic processes in accordance with the principle of the colour-yielding development of silver halide emulsion layers, it is additionally possible to produce in a material superimposed holograms in different colours when using multi-layer materials with selective sensitisation of the separate layers. By this means, the hologram reconstruction, also of coloured subjects in natural colours, is possible by means of the holograms according to the invention.

As already mentioned above, certain types of transmission holograms according to the invention are characterised by a faint and uniform dyeing of the layer carrying the hologram structure. This dyeing is advantageously carried out by the photographic layer being treated before or after production of the hologram with a bath containing a dyestuff which has, as far as possible as regards the absorption, the same properties as the image dyestuff. In order to prevent the dyestuff from being washed out or the layer losing colour, it is advantageous to use those dyestuffs which can be substantively absorbed on the binder of the layer, advantageously gelatine, or can be fixedly combined with the layer binder by mordanting. Suitable dyestuffs can be easily selected by a few tests on the large number of known dyestuffs.

The holograms according to the invention can also be reconstructed in a particularly simple manner, because white light can be used for the reconstruction. Particularly good results are obtained if the information-carrying structure consists of dyestuffs with an absorption band having steep flanks and smallest possible width. When reconstructing with white light, only that region of the light which lies in the absorption range of the dyestuff is then operative for an amplitude modulation.

If the dispersion effects further described hereinafter can be disregarded, the other wavelengths pass without diffraction through such a hologram, and thus also contribute nothing to the reconstructed image. With the reconstruction of such holograms with white light, it is consequently unnecessary to use a special spectral filter.

Figure 1:
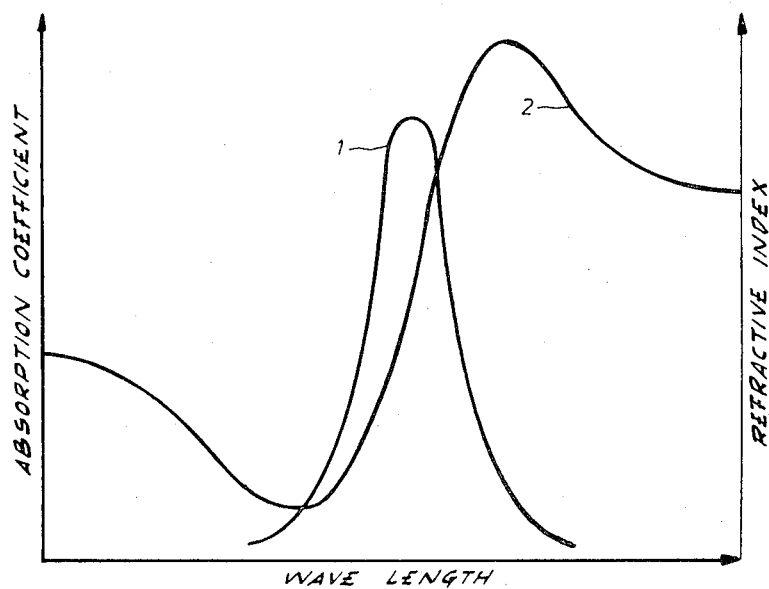
FIG. 1 shows absorption and refraction indices plotted against wave lengths of light.
Figure 2:
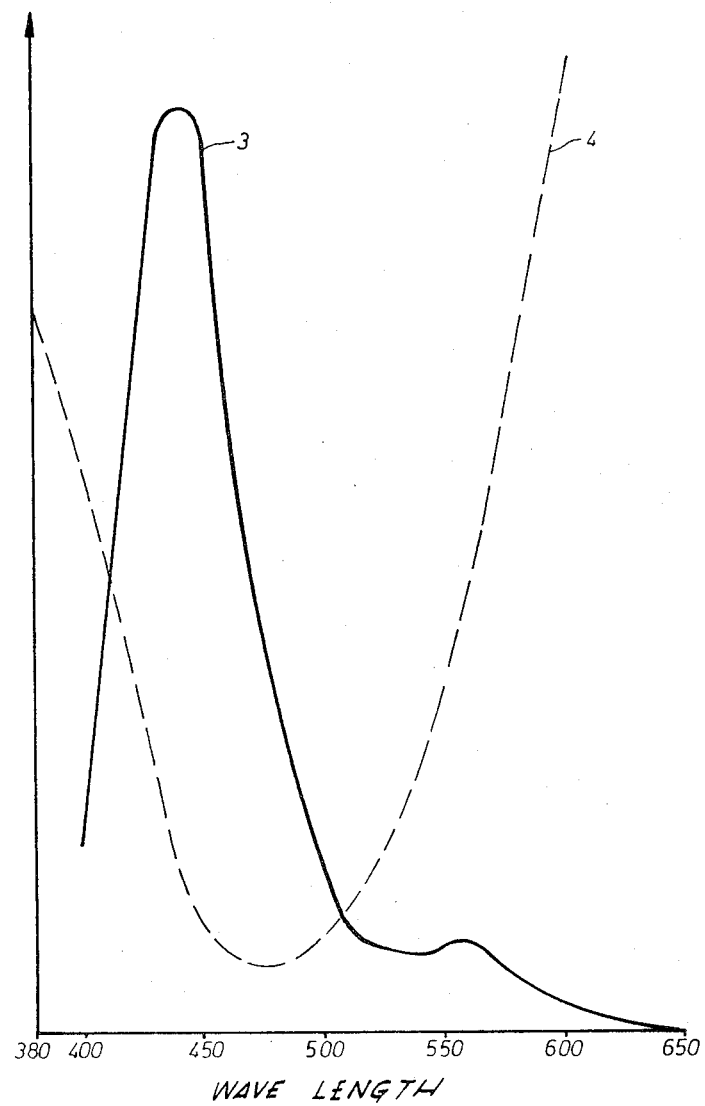
FIG. 2 shows characteristics against wavelengths of light.

Since dyestuffs show the effect of the abnormal dispersion of the light, i.e., a sudden increase in the refractive index in the absorption range, this dispersion can be utilised in the preferred embodiment for the reconstruction of the hologram for phase modulation. This is shown in respect of a typical example in FIG. 1. The wavelengths are plotted on the abscissae and the absorption for the curve 1 and the refractive index for the curve 2, respectively, are plotted on the ordinates.

A minimum of the refractive index lies on the short-wave side of the absorption band, and within the band it increases with increasing wavelength (abnormal dispersion) and, after reaching a maximum, it falls again on the long-wave side of the absorption band. These differences in refractive index can be utilised for a wavelength-dependent phase modulation. In this respect, there is available the great advantage of the phase modulation: substantially higher diffraction efficiency (e.g., the percentage of the incident light which is utilised for the construction) of the phase hologram relatively to absorption holograms. At the same time, there is produced a spectral selectivity such as hitherto shown by phase holograms only as so-called Bragg holograms. However, Bragg holograms of such a high quality with regard to the high spatial frequencies required in this case are not available up to now.

By comparison with known holographic processes, the following essential advantages are produced here, particularly for the exposure of coloured subjects and reconstruction in natural colours:

1. In this respect, greater light intensity will be achieved in the reconstructed image:
   a. by comparison with the (Bragg) absorption holograms, with which in principle it is not possible to achieve the diffraction efficiency of phase holograms;
   b. by comparison with the Bragg phase holograms, since the materials suitable for this purpose have hitherto still been far removed from the theoretically possible efficiency.
2. The wavelength-selective phase modulation offers for the first time the possibility of reconstructing coloured images with white light from transmission phase holograms.

Examples for the production of coloured transmission holograms.

EXAMPLE 1:

A photographic material is used which consists of a gelatino-silver bromiodide layer with 3.8 mol% iodide content and an average grain size of 0.05 $\mu$m and a narrow grain size distribution.

The average quadratic dispersion range of the size distribution is $\approx$0.03 $\mu$m. The packing density is higher than 0.3 g of silver per cc. The layer is panchromatically sensitised.

The hologram structure is produced on this highly-dispersing fine-grain silver halide layer by interference of a pencil of rays coming from the subject and of a direct pencil of rays; the two pencils of rays must be coherent with one another and consequently are produced from a He-Ne laser ($\gamma = 632.8$ $\mu$m) by beam division.

By the processing steps which are hereinafter described, the latent image produced by the exposure of the hologram to light is transformed into a negative cyan colour image of the hologram.

1. Development for 12 minutes at 20°C in the following bath:
   N,N-diethyl-p-phenylenediamine sulphate — 2.75 g
   Sodium hexametaphosphate — 2 g
   Hydroxylamine sulphate — 1.2 g
   Sodium sulphite — 2 g
   Potash — 75 g
   Potassium bromide — 2.5 g
   2.6-Dibromo-1,5-dihydroxy-naphthalene — 1 g
2. Rinsing for 5 minutes
3. Bleaching for 5 minutes in the following bath:
   Potassium ferricyanide — 42 g
   Potassium bromide — 12 g
   Disodium phosphate — 6 g
   Sodium hexametaphosphate — 6 g
   Monopotassium phosphate — 16 g
4. Rinsing for 5 minutes
5. Fixing for 5 minutes in the following bath:
   Ammonium thiosulphate — 150 g
   Sodium sulphite — 10 g
6. Rinsing for 10 minutes
7. Drying (all quantities are related to 1 litre).

Example 2:

A photographic material is used which consists of a gelatino-silver bromiodide layer with 6.3 mol% iodide content and a mean grain size of 0.05 $\mu$m and a narrow grain size distribution. The average quadratic dispersion range of the size distribution is $\approx$0.03 $\mu$m. The packing density is above 0.3 g of silver per cc. The layer is panchromatically sensitised and contains 20 g of 1-(4-phenoxy-3-sulphophenyl)-3-heptadecyl-5-pyrazolone per kg of emulsion as magenta coupler.

The hologram structure is exposed as in Example 1 on this highly resolving fine-grain colour coupler-containing silver halide layer, as in Example 1.

By the following processing procedure, the latent image produced by the hologram exposure is transformed into a negative magenta dyestuff image of the hologram.

1. Development for 8 minutes at 20°C in the following bath:
   N,N-diethyl-p-phenylenediamine sulphate — 2.75 g
   Sodium hexametaphosphate — 2 g
   Hydroxylamine sulphate — 1.2 g
   Sodium sulphite — 2 g
   Potash — 75 g
   Potassium bromide — 2.5 g
   2. Rinsing for 5 minutes 3. Bleaching for 5 minutes in the following bath:
   Potassium ferricyanide — 42 g
   Potassium bromide — 12 g
   Disodium phosphate — 6 g
   Sodium hexametaphosphate — 6 g
   Monopotassium phosphate — 16 g
4. Rinsing for 5 minutes
5. Fixing for 5 minutes in the following bath:
   Ammonium thiosulphate — 150 g
   Sodium sulphite — 10 g
6. Rinsing for 10 minutes
7. Drying
   (All quantities are related to 1 litre)

Examples for the production of coloured transmission holograms with a dyed background.

Example 3

A photographic material is used which consists of a gelatino-silver bromiodide layer with an iodide content of 3.8 mol percent, an average grain size of 0.05 $\mu$m and a narrow grain size distribution.

The mean quadratic deviation range of the size distribution is 0.03 $\mu$m. The packing density is higher than 0.3 g of silver per cc. The layer is panchromatically sensitised.

The hologram structure is produced on this highly resolving fine-grain silver halide layer by interference of a pencil of rays coming from the object and a direct pencil of rays; the said two pencils must be coherent with one another and consequently are preferably produced by beam division from a laser, e.g., a He-Ne-laser ($\lambda$ = 632.8 $\mu$m), the intensity of the pencil of reference beams being at all places greater than that of the object pencil. Both specimens are processed in the same way as hereinafter described to a negative magenta image of the hologram.

1. Development for 12 minutes at 20°C in the following bath:
   N,N-diethyl-p-phenylenediamine sulphate — 2.75 g
   sodium hexametaphosphate — 2 g
   hydroxylamine sulphate — 1.2 g
   sodium sulphite — 2 g
   potash — 75 g
   potassium bromide — 2.5 g
   2-cyanoacetyl cumarone — 1 g
2. Rinsing for 5 minutes
   Two specimens are exposed for different times, one for half a second and the other for 8.10³ seconds.
3. Bleaching for 5 minutes in the following bath:
   potassium ferricyanide — 42 g
   potassium bromide — 12 g
   disodium phosphate — 6 g
   sodium hexametaphosphate — 6 g
   monopotassium phosphate — 16 g
4. Rinsing for 5 minutes
5. Fixing for 5 minutes in the following bath:
   ammonium thiosulphate — 150 g
   sodium sulphite — 10 g
6. Rinsing for 10 minutes
7. Drying
   (All quantities are related to 1 litre.)

The specimen exposed for a short time shows the hologram structure on a colourless background. The specimen exposed for a longer time has a uniformly magenta-coloured background.

The diffraction efficiency which is obtained with the reconstruction of the holograms is reproduced in the accompanying FIG. 3. In this Figure, the abscissa represents the wavelength and the ordinate the diffraction efficiency. Curve 1 corresponds to the specimen exposed for the shorter time and curve 2 to that exposed for the longer time and having the coloured background. It is to be clearly seen that, with this curve, the effect of the amplitude modulation has fallen practically to zero, whereas the phase modulation has even increased somewhat because of the abnormal dispersion and thus the diffraction efficiency.

Examples for the production of dyed transmission holograms with improved resolving power.

Example 4

A photographic material is used, consisting of a gelatino-silver bromiodide layer with an iodide content of 3.8 mol %, an average grain size of 0.05 $\mu$m and a narrow grain size distribution.

The average quadratic dispersion range of the size distribution is ≈0.03 $\mu$m. The packing density is greater than 0.3 g of silver per cc. The layer is panchromatically sensitised.

The hologram structure is produced on this highly resolving fine-grain silver halide layer by interference of a pencil of rays coming from the object and a direct pencil of rays, it being necessary for both pencils to be coherent relatively to one another and accordingly they are preferably produced by ray division from a laser, e.g. a He-Ne-laser ($\lambda$ = 632.8 $\mu$m.).

By the processing procedure as hereinafter described, the latent image produced by the hologram exposure is transformed into a negative cyan colour image of the hologram:

1. Development for 5 minutes at 20°C in the following bath:
   p-methylaminophenol — 7.5 g
   sodium sulphite — 40 g
   hydroquinone — 3.5 g
   sodium carbonate — 30 g
   potassium bromide — 3 g
2. Rinsing for 5 minutes
3. Fixing for 5 minutes in the following bath:
   ammonium thiosulphate — 165 g
   sodium sulphite — 11 g
   sodium hexametaphosphate — 3 g
4. Rinsing for 15 minutes
5. Bleaching for 5 minutes in the following bath:
   potassium ferricyanide — 42 g
   potassium bromide — 12 g
   disodium phosphate — 6 g
   sodium hexametaphosphate — 6 g
   monopotassium phosphate — 16 g
6. Rinsing for 15 minutes
7. Second exposure for 60 seconds on the illuminating box — 3,000 Lux.
8. Colour development for 12 minutes at 20°C in the following bath:
   N,N-diethyl-p-phenylenediamine sulphate — 2.75 g
   sodium hexametaphosphate — 2.0 g
   hydroxylamine sulphate — 1.20 g
   sodium sulphite — 2.0 g
   potash — 75 g
   potassium bromide — 2.50 g
   2,6-dibromo-1,5-dihydroxy-naphthalene — 1 g
9. Rinsing for 5 minutes
10. Bleaching for 5 minutes in the same bath as indicated under 5).

11. Rinsing for 5 minutes
12. Fixing for 5 minutes in the same bath as indicated under 3)
13. Final rinsing for 15 minutes.
14. Drying of the layer A cyan-coloured hologram negative is obtained with excellent resolution.

If a two-beam interference figure (818 lines per mm) is produced by this method and compared with a similar interference structure which has been produced according to Example 1 the following results are obtained by holographic evaluation.

TABLE

| Hologram | Diffraction efficiency at 440 μm |
|---|---|
| according to example 4 | 6.40% |
| according to example 1 | 1.97% |

Example 5

Production of a hologram by a reversal process:

A photographic material is used which consists of a gelatino-silver bromiodide layer with an iodide content of 6.3 mol percent, an average grain size of 0.05 μm and a narrow grain size distribution.

The average quadratic dispersion range of the size distribution is 0.03 μm. The packing density is higher than 0.3 g. of silver per cc. The layer is panchromatically sensitised.

The hologram structure is produced on this highly resolving fine-grain silver halide layer by interference of a pencil of rays coming from the object and a direct pencil of rays, it being necessary for both pencils to be coherent with one another and they are therefore preferably produced from a He-Ne-laser (λ =632.8 μm) by ray division. The intensity of the two pencils radiated on to the photographic material or the exposure time which is used must be higher by a factor of 5 to 50 by comparison with the light exposure used in Example 1 in order to obtain an optimal result.

The latent image produced by the hologram exposure is processed by the processing operation as hereinafter described to form a positive magenta colour image of the hologram:

1. First development for 5 minutes at 20°C
   N-methyl-p-aminophenol — 7.5 g
   sodium sulphite — 40 g
   hydroquinone — 3.5 g
   sodium carbonate — 30 g
   potassium bromide — 3 g
2. Rinsing for 5 minutes
3. Bleaching for 5 minutes at 20°C in the following bath:
   potassium bichromate — 5 g
   sodium bisulphate — 20 g
4. Rinsing for 5 minutes
5. Clarifying bath for 3 minutes at 20°C
   crystalline potassium bisulphite — 65 g
6. Rinsing for 5 minutes
7. Second exposure uniformly, 3,000 Lux, 2 min.
8. Second development for 6 minutes at 20°C
   sodium hexametaphosphate — 2 g
   N-methyl-p-aminophenol — 5 g
   anhydrous sodium sulphite — 40 g
   hydroquinone — 6 g
   potassium carbonate — 40 g
   potassium bromide — 2 g
9. Rinsing for 2 minutes
10. Fixing for 5 minutes at 20°C
    ammonium thiosulphate — 165 g
    sodium sulphite — 11 g
    sodium hexametaphosphate — 3 g
11. Rinsing for 5 minutes
12. Bleaching for 5 minutes
    potassium ferricyanide — 42 g
    potassium bromide — 12 g
    sodium hexametaphosphate — 6 g
    disodium phosphate — 6 g
    monopotassium phosphate — 16 g
13. Rinsing for 5 minutes
14. Third exposure, uniformly 300 Lux, 2 min.
15. Colour development for 10 minutes at 20°C
    sodium sulphite — 2 g
    sodium hexametaphosphate — 2 g
    N,N-diethyl-p-phenylenediamine sulphate — 2.75 g
    hydroxylamine sulphate — 1.20 g
    potassium carbonate — 75 g
    potassium bromide — 2.50 g
    2-cyanoacetyl cumarone — 1 g
16. Rinsing for 5 minutes
17. Bleaching for 5 minutes
18. Rinsing for 5 minutes
19. Fixing for 10 minutes at 20°C in the same bath as indicated under 10).
20. Rinsing for 15 minutes
21. Drying A magenta-coloured hologram positive with outstanding resolving power is obtained. The diffraction efficiency which is achieved is excellent.

We claim:

1. The method of producing a transmission hologram in a gelatino-silver bromo-iodide emulsion layer having an average grain size of the order of 0.05μm and a narrow grain size distribution which method comprises dividing a laser beam into two coherent pencil laser beams, directing one of said beams as an object beam on an object, directing the other of said beams as a reference beam onto said emulsion layer from one side of said layer directing the object beam from the object onto the same side of said emulsion layer as the reference beam, said reference beam having greater intensity than said object beam, producing an interference of the rays of the object beam and the rays of the reference beam at the layer, producing by said interference a latent hologram image in said layer by selective exposure of photo sensitive grains in said layer, treating the layer in a development dye-forming solution to transform the latent image into a magenta or cyan color image of the hologram, fixing, rinsing and bleaching the color developed emulsion layer, uniformly exposing the color processed image-containing emulsion layer to light of color processing spectral-energy distribution, treating the layer in a dye-forming developer solution then rinsing, fixing and bleaching the layer to produce a magenta or cyan colored interference pattern hologram structure and the layer portions between the hologram structure dyed with dyestuff having same absorption properties as the image dyestuff, the dyestuff of said dyed interference pattern having a maximum wavelength absorption region and dispersion curve in the spectral region above 600 millimicrons providing a diffraction efficiency of above 8 percent and the diffraction efficiency of the dyestuff in the spectral region below 560μm being less than 2 percent and the dyestuff dyeing the layer portions between the hologram structure having a color density of 0.3 to 0.5.

* * * * *